(12) United States Patent
Laws et al.

(10) Patent No.: US 7,273,364 B2
(45) Date of Patent: Sep. 25, 2007

(54) DROP BOX WITH THERMAL ISOLATION

(75) Inventors: David J. Laws, Provo, UT (US); M. Taw Lindsey, Metlakatla, AK (US)

(73) Assignee: MFS, LLC, Orem, UT (US)

( * ) Notice: Subject to any disclaimer, the term of this patent is extended or adjusted under 35 U.S.C. 154(b) by 264 days.

(21) Appl. No.: 11/129,667

(22) Filed: May 13, 2005

(65) Prior Publication Data

US 2006/0257518 A1 Nov. 16, 2006

(51) Int. Cl.
*B29C 31/02* (2006.01)

(52) U.S. Cl. ............. 425/64; 425/110; 425/129.2; 425/144; 425/578

(58) Field of Classification Search ............ 425/64, 425/78, 110, 144, 129.1, 129.2, 258, 345, 425/384 R, DIG. 55, 578–580
See application file for complete search history.

(56) References Cited

U.S. PATENT DOCUMENTS

| | | | |
|---|---|---|---|
| 1,953,585 A | 4/1934 | Brown | |
| 2,602,564 A | 7/1952 | Ziskin et al. | |
| 3,202,745 A | 8/1965 | Ringdal | |
| 3,438,115 A | 4/1969 | Humphress et al. | |
| 4,167,382 A | 9/1979 | Freedman et al. | |
| 4,683,098 A | 7/1987 | Belleville et al. | |
| 4,716,003 A | 12/1987 | Gaudreau | |
| 5,073,325 A | 12/1991 | Gray | |
| 5,641,439 A | 6/1997 | Rogerson | |
| 6,214,272 B1 | 4/2001 | Gruenwald et al. | |
| 6,296,792 B1 | 10/2001 | Payne | |
| 6,383,437 B1 | 5/2002 | Grieve | |
| 6,899,839 B2 * | 5/2005 | Fifield | 425/351 |
| 2004/0045488 A1 | 3/2004 | Danzik et al. | |
| 2004/0096608 A1 | 5/2004 | King et al. | |

* cited by examiner

*Primary Examiner*—Yogendra N. Gupta
*Assistant Examiner*—Thu Khanh T. Nguyen
(74) *Attorney, Agent, or Firm*—Thorpe North & Western, LLP

(57) ABSTRACT

A drop box for a rotational molding system includes a substantially rigid outer shell, a substantially rigid inner shell, configured to contain unmelted polymer material, and thermal insulating material, disposed between the inner and outer shells. Substantially rigid bridge material interconnects the inner and outer shells and forms part of the rigid structure thereof. The bridge material is configured to provide a thermal break between the inner and outer shells, to reduce heat transfer therebetween.

19 Claims, 3 Drawing Sheets ural molding processes and apparatus. More particularly, the present invention relates to an improved thermally insulated drop box for holding polymer material during rotational molding.

DROP BOX WITH THERMAL ISOLATION

BACKGROUND

1. Field of the Invention

The present invention relates generally to rotational molding processes and apparatus. More particularly, the present invention relates to an improved thermally insulated drop box for holding polymer material during rotational molding.

2. Related Art

In rotational molding, a mold is simultaneously rotated about multiple (usually two) axes while being heated in an oven. Polymer material (usually powder or pellets) in the mold melts and is spread around the inside of the mold by the rotational motion. After sufficient time, the mold is removed from the oven and allowed to cool while still rotating. After sufficient cooling, rotation can be stopped and the article can be removed from the mold.

It is sometimes desirable to inject polymer material into the mold while it is rotating in the oven. To do this, a drop box or canister can be attached to the mold. The drop box is a thermally insulated container that holds the additional polymer material (again, usually powder or pellets) and shields it from melting temperatures until an appropriate time during the process. Then, a plunger or other device withdraws from the opening of the drop box to allow the additional polymer material to flow into the mold while the mold is rotating.

An important aspect of drop boxes is their thermal insulating ability. A typical drop box comprises a double-walled metal container (having, e.g. a partially conical shape) with insulation disposed between the walls. Unfortunately, the configuration of prior drop boxes tends to conduct heat to the inside of the box. This conduction is generally not sufficient to hinder one use of the drop box or subsequent uses that are temporally spaced. That is, the rate of conduction usually is not so fast as to prevent the drop box from insulating its contents while the mold and other elements heat up within the oven during rotational molding. However, it can become a problem where a drop box is very rapidly prepared for reuse, and has insufficient opportunity to cool down between uses.

SUMMARY

It has been recognized that it would be advantageous to develop for a rotational molding system a drop box that provides better insulation for its contents.

It has also been recognized that it would be advantageous to develop a drop box for a rotational molding system that can shield its contents from thermal energy even when down time between subsequent uses is quite brief.

In one aspect thereof, the invention advantageously provides a drop box for a rotational molding system, comprising a substantially rigid outer shell, a substantially rigid inner shell, configured to contain unmelted polymer material, and first thermal insulating material, disposed between the inner and outer shells. Second thermal insulating material is also provided, and interconnects the inner and outer shells and forms part of the rigid structure thereof. The second thermal insulating material is configured to provide a thermal break between the inner and outer shells, so as to reduce heat transfer therebetween.

In accordance with another aspect thereof, the invention provides a drop box for a rotational molding system, comprising a substantially rigid insulated body, including an outer shell and an inner shell, configured to contain unmelted raw polymer material within. A substantially rigid insulating material interconnects the inner shell and the outer shell, and is configured to reduce thermal conduction therebetween.

In accordance with yet another aspect thereof, the invention provides a rotational molding system, comprising a mold, an apparatus for simultaneously rotating and heating the mold, and a drop box, attached to the mold. The drop box includes a substantially rigid outer shell, a substantially rigid inner shell, configured to contain unmelted polymer material, a first insulating material, disposed between the inner and outer shells, and a second insulating material, interconnecting the inner and outer shells and forming part of the rigid structure thereof, configured to reduce transfer of heat from the outer shell to the inner shell and the unmelted polymer material.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
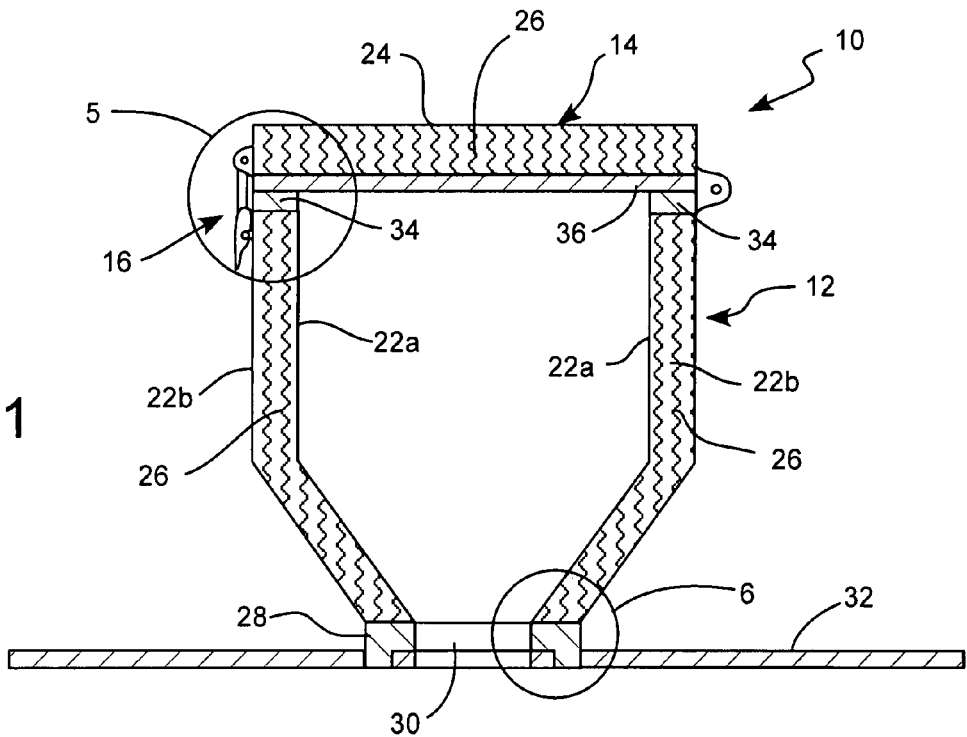
FIG. 1 is a cross-sectional view of one embodiment of a drop box in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As noted above, drop boxes are frequently associated with molds in rotational molding processes. A cross-sectional view of a typical prior art drop box 100 is provided in FIG. 2. The drop box generally comprises a container that encloses an internal space 102, and is configured to contain raw polymer material (e.g. powder or pellets) intended for introduction into a mold, as described in more detail below. The container can be generally cylindrical, hexagonal, octagonal, or some other shape in plan, and is typically tapered or partially conical in cross-section. The drop box generally comprises a container body 104, with an openable lid 106. The lid and the body include a substantially rigid outer shell 108, and a rigid inner shell 110. Between the inner shell and the outer shell, the walls of the drop box are provided with a heavy layer of insulation 112. The rigid shell can be of metal, such as stainless steel, and for use is securely connected to an outer surface or wall 114 of a mold, which is typically also of metal (e.g. cast aluminum). The connection of the drop box to the mold can be a releasable connection, such as with bolts and the like, or can be a permanent connection, such as by welding.

The drop box 100 includes at its lower end an opening or aperture 116 that is aligned with a corresponding opening 118 in the mold wall 114. These aligned openings allow polymer material to flow from the drop box into the interior cavity 120 of the mold. As shown in the drawings, the lower portion 122 of the drop box is tapered to help channel the polymer material toward the mold opening 118. The inner surfaces 124 of the inner shell 110 can be coated with a non-stick material, such as polytetrafluourethylene (PTFE or Teflon®) to help prevent undesired adhesion of polymer material inside the drop box. Similarly, the materials surrounding the aperture 118 can be selected to prevent adhesion of the contained polymer material thereto.

Figure 2:
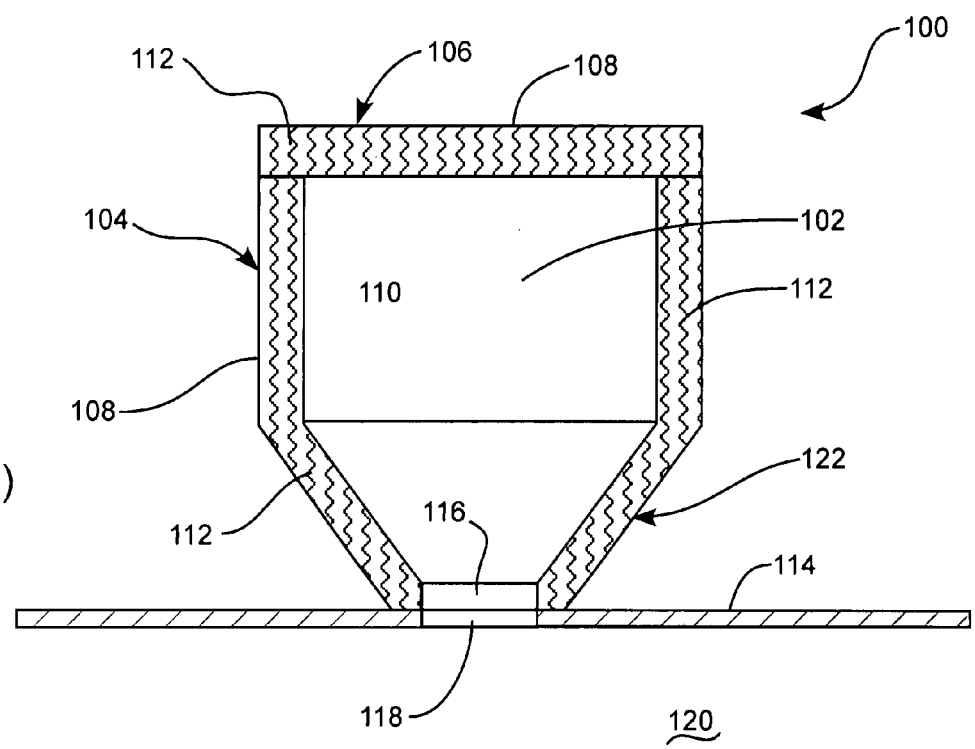
FIG. 2 is a cross-sectional view of a typical prior art drop box.
Figure 3:
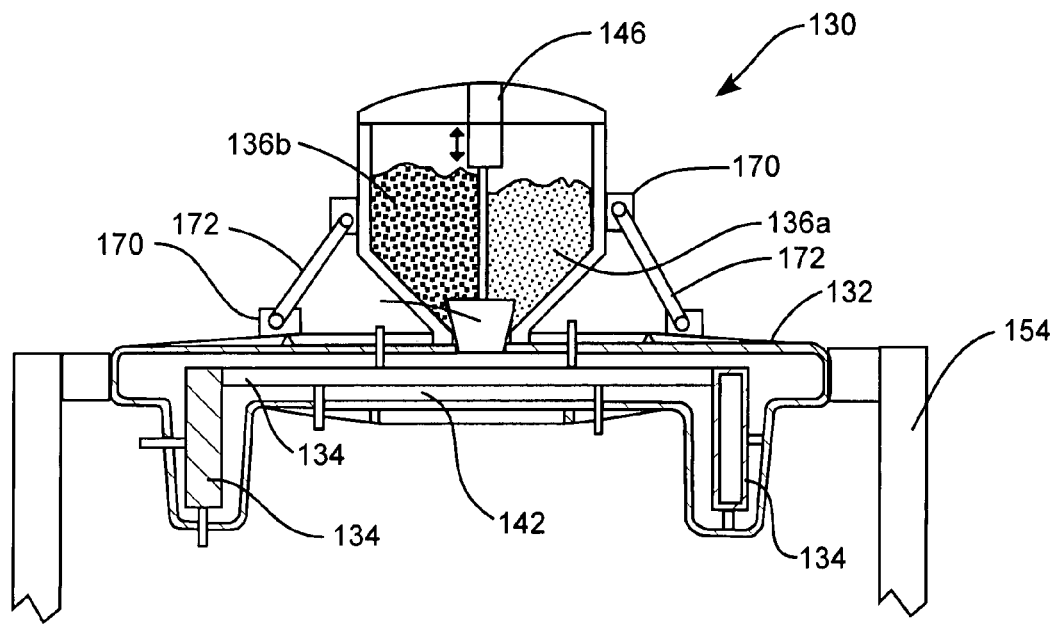
FIG. 3 is a cross-sectional view of a mold having an insulated drop box in accordance with the present invention.
Figure 4:
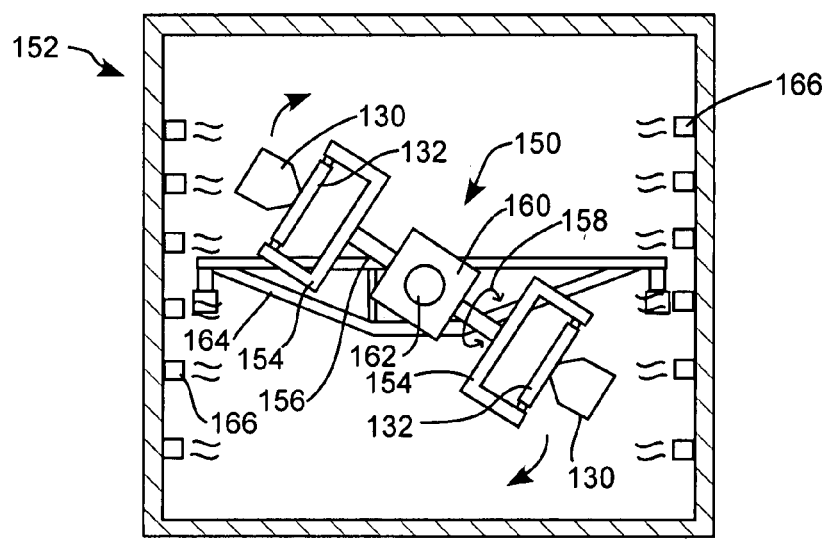
FIG. 4 is an elevation view of a rotational molding system incorporating the mold and drop box of FIG. 3.

Some other aspects and features of drop boxes that are not shown in the view of FIG. 2 are shown in the views of FIGS. 3 and 4. As shown in FIG. 3, a canister or drop box 130 is disposed on the outer periphery of a mold 132. The drop box 130 can be attached or held onto the periphery of the mold 132 by brackets 170 and connecting rods 172.

The mold depicted in the figures is a mold for a table top, and includes table frame members 134 disposed therein, to be encased in the finished rotationally molded product. However, it will be appreciated that a table mold is an exemplary application only. Those skilled in the art will recognize that rotational molds of other types and configurations can be used with drop boxes. Additionally, while the drop box shown in FIG. 3 is attached to a portion of the mold corresponding to the table top, it will be apparent that the drop box can be attached to other portions of the mold, and that the placement of the drop box on the mold can vary with the size and configuration of the mold.

As noted above, the drop box 130 is configured to hold a supply of one or more raw polymer materials 136, which are allowed to "drop" or flow into the mold 132 at a set time (or temperature) during the heating and/or cooling process. The drop box shown in FIG. 3 includes a device for selectively blocking the access hole or aperture 140 between the inner volume of the drop box and the inner cavity 142 of the mold. In the embodiment of FIG. 3, this device for blocking the aperture comprises a plunger 144, which normally blocks the access hole, but when actuated by an actuator 146, draws away from the access hole to allow the materials stored inside the canister to flow into the inner cavity of the mold. The plunger may be pneumatically, electrically, or hydraulically actuated to open. Its actuation may be triggered electrically, through either a hard-wired connection or a wireless radio frequency control system. Other mechanisms for selectively blocking and opening the access opening can also be used.

Those skilled in the art will recognize that more than one drop box may be attached to a mold to allow more than one "drop" or discharge of material into the mold during the molding process. Likewise, a drop box with more than one chamber may be used for the same purpose, as depicted in FIG. 3. The drop box 130 of FIG. 3 contains a first polymer 136a, which may be, for example, polymer pellets of relatively small size, and a second polymer 136b, which may be a polymer having larger sized particles.

To produce a rotationally-molded article in accordance with one rotational molding method, the mold 132 is first opened, and, depending on the desired combination of structural, physical and aesthetic properties desired, one or more of several procedures may be followed. Typically, the inside surfaces of the open mold are first treated with a release agent, which allows the finished product to be easily removed from the mold. Suitable release agents include silicones or Teflon®. These and other suitable release agents are well known in the art, and are readily commercially available.

A frame 134 or other reinforcing members may then be inserted into the inner mold cavity 142. After insertion of the frame, raw polymer material, usually in the form of powder or pellets, can be placed in the mold for forming a part (e.g. an outer polymer skin) of the molded article. Suitable polymers can include thermoset plastic or thermoplastic compounds, and may contain ultraviolet light inhibitors, anti-oxidants, reagents, or color additives as desired. Exemplary materials include polyethylene, polypropylene, polyvinyl chloride, and composite polyester. Other materials may also be used. Additionally, while the polymer material placed inside the mold is usually in the form of powder or pellets, liquids may also be used, and may be sprayed onto the interior mold surface.

In one mode of the rotational molding method, with the frame 134 and polymer material in the mold 132, the mold is then closed. At this point, the drop box 130 is attached to the mold, having its aperture 140 in line with the corresponding opening in the mold, and one or more raw polymer materials in the form of powder or pellets are placed into the drop box. The actuator 146 is attached to the drop box to control operation of the plunger 144, to allow the contents of the drop box to be introduced into the mold at the proper time.

When fully prepared, the mold 132 is attached to a rotational molding machine 150 which is placed into an oven 152, as shown in FIG. 4. The mold assembly is mounted on a frame 154, which is fixedly attached to the end of a rotatable shaft 156. The shaft is part of the rotational molding machine, and is driven to rotate about its longitudinal axis, in the direction shown by arrows 158, by a first mechanical power source 160, such as an electric motor. The first mechanical power source for the shaft in turn is mounted on a rotatable spindle 162, which has a longitudinal axis that is substantially perpendicular to that of the shaft. The spindle is rotatably mounted on a frame 164, and is rotationally driven by a second mechanical power source (not shown), such as an electric motor. The first and second mechanical power sources for the rotatable shaft and spindle, respectively, are configured to rotate their respective elements at speeds of anywhere from about 1 rpm to about 16 rpm, though other speeds may be used. A speed in the range of about 6 rpm to about 8 rpm is not uncommon. These components thus have the capacity to simultaneously rotate one or more molds about two orthogonal axes. This is typical of rotational molding.

As the mold 132 continuously rotates about multiple axes, the polymer in the mold is caused to spread out within the mold. Simultaneously, the oven 152, having heating elements 166, heats the mold and its contents, which causes the polymer particles to begin to melt and adhere to the inner surface of the mold. It will be apparent that a variety of heating systems can be used for heating the oven, such as electrical resistive heating elements, gas-fired convection systems, etc. The result of the heating and rotating is to form a layer of melted polymer around the inner surface of the mold.

At a preset time or temperature, the aperture 140 of the drop box 130 opens, allowing its contents to flow into the inner cavity 142 of the mold 132. Because the drop box is thermally insulated, the temperature of the polymer within the drop box will not have reached the temperature of the mold and its surroundings by the time the polymer material inside the mold does so. The contents of the drop box can include other polymer materials, and can also include foaming agents to allow the production of a rotationally molded article with an expanded polymer foam core.

Many "drops" of polymer materials, colors, or reagents may be made into the mold 132 as desired, whether from a single drop box 130 having more than one chamber (as in FIG. 3), or from multiple drop boxes attached to the same mold (not shown). For example, after the first polymer material is allowed to form a shell within the mold, a second shell polymer material may be dropped into the mold, to form a second layer inside the first. Thus one or more additional layers of polymer may be deposited one inside another. The second and subsequent layers of polymers can be of such a characteristic that each layer will mold, in sequential order, after the outer shell has been formed. Through this process, multiple materials can be molded into a laminate which becomes integrally connected into a strong mass.

The heating cycle heats the mold and its contents at a controlled rate from room temperature up to a certain maximum temperature, depending on the specific properties of the materials that are being used. The temperature may be held at certain plateaus during the heating cycle to allow certain processes to take place before triggering others. The maximum temperature may be maintained for some period of time to allow the desired reactions to go to completion, or upon reaching the desired temperature, the heating cycle may be immediately discontinued. When the heating cycle is completed, the mold 132 is removed from the oven 152, and allowed to continue rotating in a cooling area (not shown) for a given time period. The cooling cycle may last, for example, for about 25-35 minutes under various methods. While the mold is cooling, additional material drops may still be made into the inner cavity 140 of the mold. After cooling, the molded part is removed, and the process can be repeated.

Unfortunately, when producing rotationally molded articles in accordance with the method outlined above, the configuration of many drop boxes tends to conduct heat to the inside of the box. As noted above, a typical drop box comprises a metal shell that includes metal parts that are continuous from the exterior to the interior. Because metals are thermal conductors, this construction tends to conduct heat into the interior of the drop box. However, this conduction can cause the contents of the drop box to heat up too high. For example, the polymer that is contained in the drop box may include foaming agents or other substances that need to be maintained at below 100° F. prior to their introduction into the mold. However, the outside environment of the rotational molding oven may be at or above 600° F.

Conduction of heat from the exterior to the interior of the drop box is generally not sufficient to hinder one use of the drop box or subsequent uses that are relatively widely spaced in time. However, heat conduction can become a problem where a drop box is very rapidly reused time after time. With rapid reuse, the interior can gradually heat up above an allowable temperature, and thus cause the interior of the drop box to be too hot at the beginning of a molding cycle. Additionally, molds for rotational molding, which are often made of cast aluminum that is extensively machined, can be very expensive, making it cost effective to use fewer molds more frequently, rather than to have many expensive molds that are used less frequently. Likewise, if a rotational molding process is streamlined so as to allow a given mold to be prepared for reuse very quickly after removal of the previously molded item from the mold (i.e. short turnaround time), the mold and drop box may have insufficient opportunity to cool down between uses, and the interior of the drop box can begin to heat up.

Advantageously, the inventors have developed an improved drop box that provides a thermal break between the interior and exterior of the box. A cross-sectional view of one embodiment of such a drop box 10 is provided in FIG. 1. The drop box generally comprises a container body 12, with a lid 14 hingedly attached to the body. The lid is openable to allow material to be placed therein, and includes a latch 16, such as a cam latch, to allow the lid to be closed and secured. Other types of latching mechanisms can also be used.

While a device for blocking the aperture or access opening 30, such as a plunger mechanism (144 in FIG. 3) is not shown in the view of FIG. 1, this and other features common to drop boxes generally are presumed to be present. The body 12 of the drop box 10 comprises a shell having substantially rigid inside and outside walls 22a, 22b. Similarly, the lid 14 comprises an outer shell wall 24. These walls can be of metals, such as stainless steel, as described above. The surface of the inner shell 22a can be treated or provided with a non-stick coating, such as Teflon®, to help prevent polymer material from sticking to it. Disposed between the inner and outer shell walls, and within the lid, is heavy thermal insulating material 26, such as tightly packed wool or fiberglass, or the like.

Advantageously, the inner and outer shell walls, 22a, 22b, are not directly connected to each other, but instead are connected by a substantially rigid bridge material that forms part of the structure of the drop box, and also provides a thermal break or thermal isolation between the inner and outer shells. Specifically, the drop box includes a bottom flange 28 that surrounds the aperture 30 between the drop box 10 and the mold 32, and a top rim 34 that abuts a lower mating surface 36 of the lid 14. The lower flange and the top rim are formed of solid pieces of substantially rigid insulating material, and interconnect the inner and outer shells. Likewise, the lower mating surface of the lid can be of the same or similarly functioning solid insulating material, as shown. Alternatively, the central portion of the inside of the lid (i.e. the region away from the area of mating with the top rim) could include a metal inner surface or some other material different from the thermal bridge material.

The bridge material serves as a thermal break between the inside and outside of the drop box. This rigid insulating material mechanically functions as part of the structure of the drop box because it structurally supports and connects the inner and outer box portions. At the same time, it also thermally separates or isolates the outside and inside metal surfaces. One suitable insulating material that the inventors have used to form the thermal break is solid polytetrafluoroethylene (Teflon®), which is commercially available from Dupont® and can be machined into any desired shape and configuration. Thus, the bottom flange 28, top rim 34, and lower mating surface 36 of the lid 14 can be machined to exactly the proper shape and size for their respective functions, and can also be provided with holes for fasteners, etc.

Figure 5:
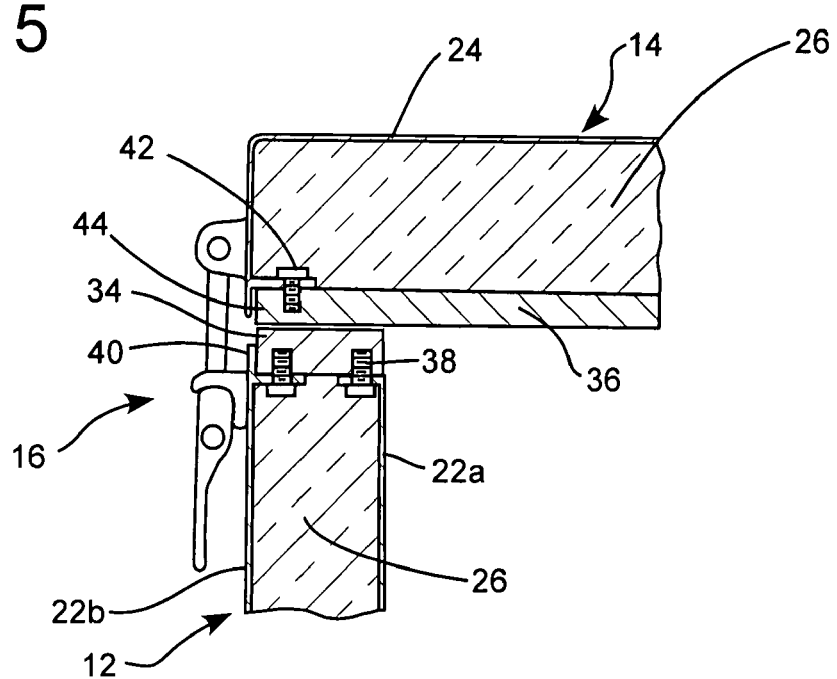
FIG. 5 is a cross-sectional detail view of a portion of the drop box of FIG. 1.

A close-up cross-sectional detail view of the top rim 34 and lid 14 of the drop box is provided in FIG. 5. As shown, the outer shell 22b and inner shell 22a are attached to the top rim with fasteners 38, though other attachment mechanisms can be used. A lip 40 of the outer shell may be provided to cover some or all of the outer exposed portion of the top rim, for the sake of appearance, though this feature is not required and does not significantly affect the functioning of the drop box. The outer shell or wall 24 of the lid is attached to the upper side of the lower mating surface 36 of the lid with fasteners 42, and a lip 44 may be provided to cover the outer edge of the lower mating surface for a pleasing appearance. Because the outer shell surfaces are not directly connected to the inner shell portions, a thermal break is created between these structures.

Figure 6:
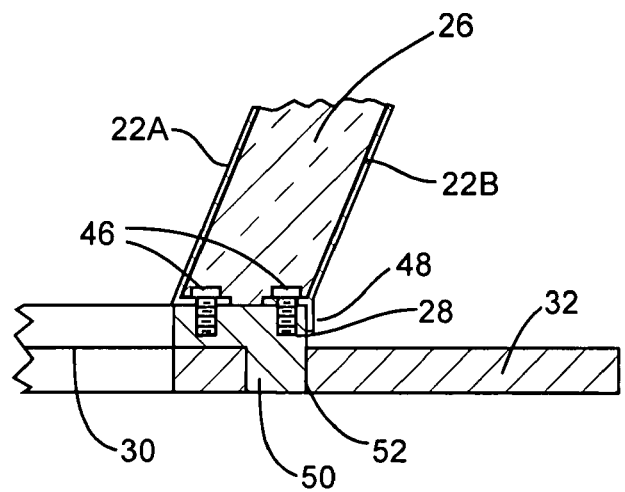
FIG. 6 is a cross-sectional detail view of another portion of the drop box of FIG. 1.

A close-up cross-sectional view of the bottom flange 28 is shown in FIG. 6. The bottom flange is connected to the outer and inner shells 22b, 22a, with fasteners 46, and provides a thermal break therebetween. As with the top rim, a lip 48 of the outer shell may be formed to extend down and cover the outer exposed portion of the bottom flange, for the sake of appearance. The bottom flange provides the structure of the box that directly contacts the mold 32. The flange can have a tab 50 that fits tightly into a slot 52 on the mold, and can be sealed with flexible sealant such as silicone to prevent leakage.

The invention thus provides a drop box that can be used and reused in rapid succession without its interior heating up beyond tolerable limits for use.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A drop box for a rotational molding system, comprising:
   a) a substantially rigid outer shell;
   b) a substantially rigid inner shell within the outer shell, having an interior configured to contain unmelted polymer material;
   c) thermal insulating material, disposed between the inner and outer shells; and
   d) substantially rigid bridge material, interconnecting the inner and outer shells to create a substantially rigid structure, the bridge material being configured to provide a thermal break between the inner and outer shells, so as to reduce heat transfer therebetween.

2. A drop box in accordance with claim 1, wherein the bridge material comprises a substantially rigid high temperature polymer material.

3. A drop box in accordance with claim 2, wherein the bridge material comprises solid polytetrafluourethylene.

4. A drop box in accordance with claim 1, further comprising:
   a) an outlet, configured to allow egress of polymer material from the interior of the drop box into a mold; and
   b) substantially rigid bridge material surrounding the outlet and interconnecting the inner and outer shells at the outlet.

5. A drop box in accordance with claim 1, wherein the inner shell includes a non-stick coating.

6. A drop box in accordance with claim 5, wherein the non-stick coating comprises polytetrafluourethylene.

7. A drop box in accordance with claim 1, wherein the outer shell comprises stainless steel.

8. A drop box in accordance with claim 1, further comprising an openable lid, configured to allow selective access to an interior of the drop box, the lid having mating surfaces comprising substantially rigid bridge material forming a portion of the structure of the lid.

9. A drop box in accordance with claim 8, wherein the lid is hingedly connected to the outer shell.

10. A drop box in accordance with claim 1, wherein the interior of the drop box includes more than one compartment.

11. A drop box for a rotational molding system, comprising:
    a) a substantially rigid insulated body, including thermally discontinuous inner and outer shells, the inner shell configured to contain unmelted raw polymer material therewithin; and
    b) substantially rigid bridge material, interconnecting the inner shell and the outer shell, configured to provide a thermal break therebetween.

12. A rotational molding system, comprising:
    a) a mold;
    b) an apparatus for simultaneously rotating and heating the mold; and
    c) a drop box, attached to the mold, including:
       a. a substantially rigid outer shell;
       b. a substantially rigid inner shell, configured to contain unmelted polymer material;
       c. insulating material, disposed between the inner and outer shells; and
       d. substantially rigid bridge material, interconnecting the inner and outer shells to create a substantially rigid structure, the bridge material being configured to provide a thermal break between the outer shell and the inner shell, to reduce transfer of heat therebetween.

13. A rotational molding system in accordance with claim 12, wherein the bridge material comprises a substantially rigid polymer material.

14. A rotational molding system in accordance with claim 13, wherein the bridge material comprises solid polytetrafluourethylene.

15. A rotational molding system in accordance with claim 12, further comprising an openable lid, configured to allow selective access to an interior of the drop box, the lid having mating surfaces comprising substantially rigid bridge material forming a portion of the structure of the lid.

16. A rotational molding system in accordance with claim 15, wherein the lid is hingedly connected to the outer shell.

17. A rotational molding system in accordance with claim 12, wherein the interior of the drop box includes more than one compartment.

18. A rotational molding system in accordance with claim 12, wherein the drop box includes an aperture in communication with an interior of the mold, and further comprising a device for selectively closing the aperture, so as to allow selective release of the unmelted polymer material from the drop box into the mold.

19. A drop box for a rotational molding system, comprising:
    a) an outer metal shell, attached to a mold having an interior;
    b) an inner metal shell, having a non-stick coating, enclosing an interior of the drop box and configured to contain unmelted polymer material;
    c) a door, configured to provide selective access to the interior of the drop box;
    d) an access port, interconnecting the interior of the drop box and the interior of the mold;
    e) a device configured to allow selective opening and closing of the access port;

f) substantially non-rigid insulating material, disposed between the inner and outer shells; and g) substantially rigid bridge material, having a non-stick surface, disposed surrounding the access port, adjacent the door, and interconnecting the inner and outer metal shells so as to reduce transfer of heat therebetween.

* * * * *